(12) United States Patent
Yew et al.

(10) Patent No.: US 6,299,130 B1
(45) Date of Patent: Oct. 9, 2001

(54) EEGR VALVE WITH FLEXIBLE BEARING

(75) Inventors: Kwang Yew; John Edward Cook, both of Chatham (CA)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/418,288

(22) Filed: Oct. 14, 1999

(51) Int. Cl.$^7$ ..................................................... F16K 31/02
(52) U.S. Cl. ........................................ 251/129.15; 251/77
(58) Field of Search ................................ 251/129.15, 77

(56) References Cited

U.S. PATENT DOCUMENTS

| | | | |
|---|---|---|---|
| 3,921,670 | * | 11/1975 | Clippard, Jr. et al. ...... 251/129.15 X |
| 4,538,643 | * | 9/1985 | Goedecke et al. ........... 251/129.15 X |
| 4,569,504 | * | 2/1986 | Doyle ................................ 251/129.15 |
| 4,635,683 | * | 1/1987 | Nielsen ........................ 251/129.15 X |
| 4,732,362 | * | 3/1988 | Morioka et al. ............. 251/129.15 X |
| 4,890,815 | * | 1/1990 | Hascher-Reichl et al. ..... 251/129.15 |
| 4,988,074 | * | 1/1991 | Najmolhoda ................. 251/129.15 X |
| 5,158,263 | * | 10/1992 | Shimizu et al. ................. 251/129.21 |
| 5,374,029 | * | 12/1994 | Bailey .............................. 251/129.16 |
| 5,513,832 | * | 5/1996 | Becker et al. ............... 251/129.15 X |
| 5,588,414 | * | 12/1996 | Hrytzak et al. ............. 251/129.15 X |
| 5,626,165 | * | 5/1997 | Shinobu ........................ 251/129.15 X |
| 5,957,117 | * | 9/1999 | Everingham ................ 251/129.15 X |
| 6,119,725 | * | 9/2000 | Shinobu et al. ............. 251/129.15 X |

* cited by examiner

*Primary Examiner*—Kevin Shaver
*Assistant Examiner*—John Bastianelli

(57) ABSTRACT

An EEGR valve has a solenoid with an armature supported at each end on circular disks. These disks are fixed to the top and bottom having numerous penetrations (e.g., slots, slits or openings) to permit the disks to be deflected upward or downward. The penetrations are arranged such that when a current is applied to the solenoid coil the armature deflects the disks and permits the armature to move up and down within the coil. The penetrations are arranged as concentric rings of penetrations. The disks are fixed at several locations around their edges to the stator of the solenoid. In this manner, the armature moves back and forth along its axis and not laterally, thus permitting the stator to be located quite close to the armature without wearing against the stator, A spring is provided to preload the armature and deflect the disks in a concave shape different from their unloaded and substantially flat configuration. In this manner, the coil can drive the solenoid.

16 Claims, 5 Drawing Sheets

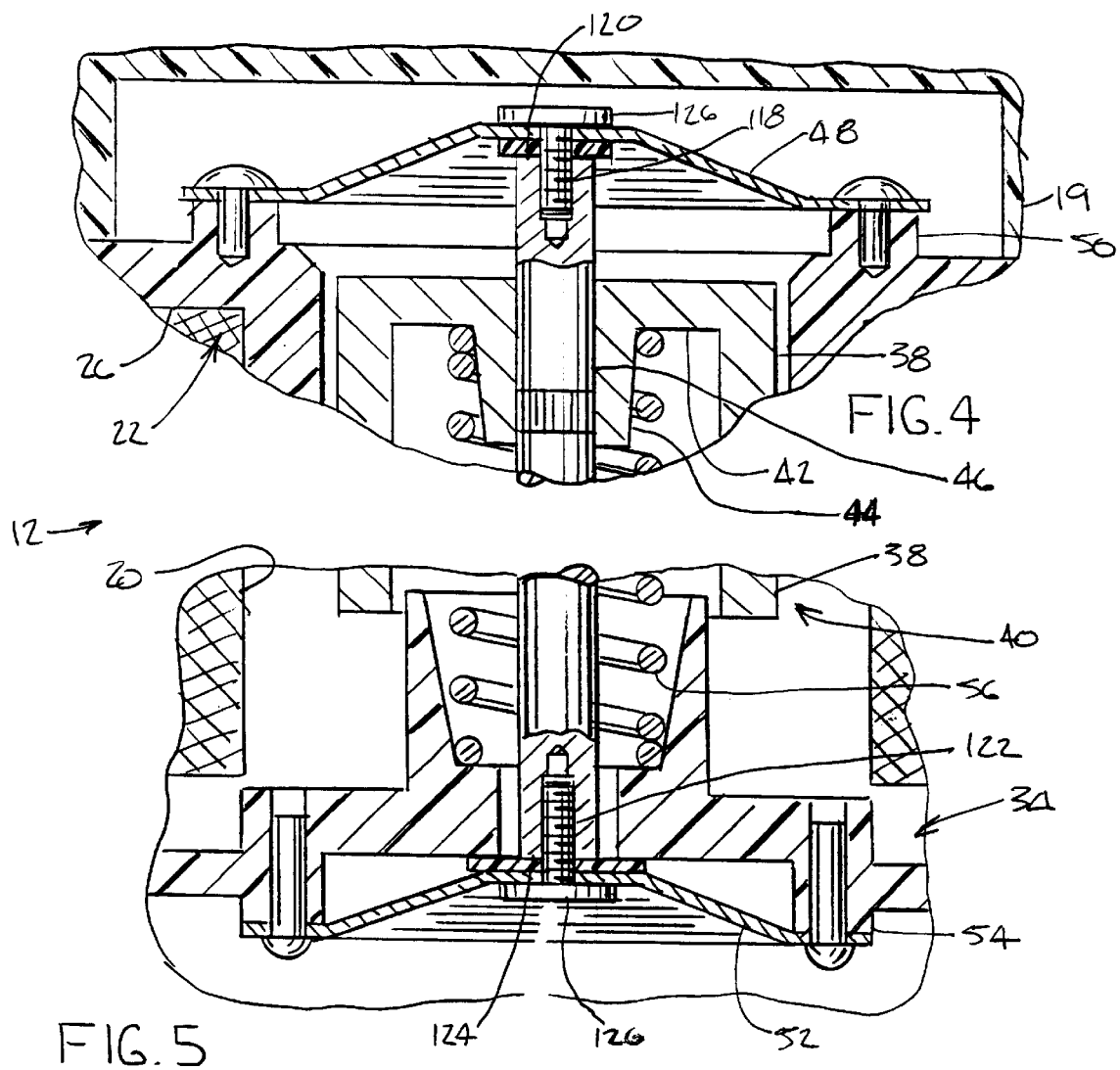
FIG. 4
FIG. 5
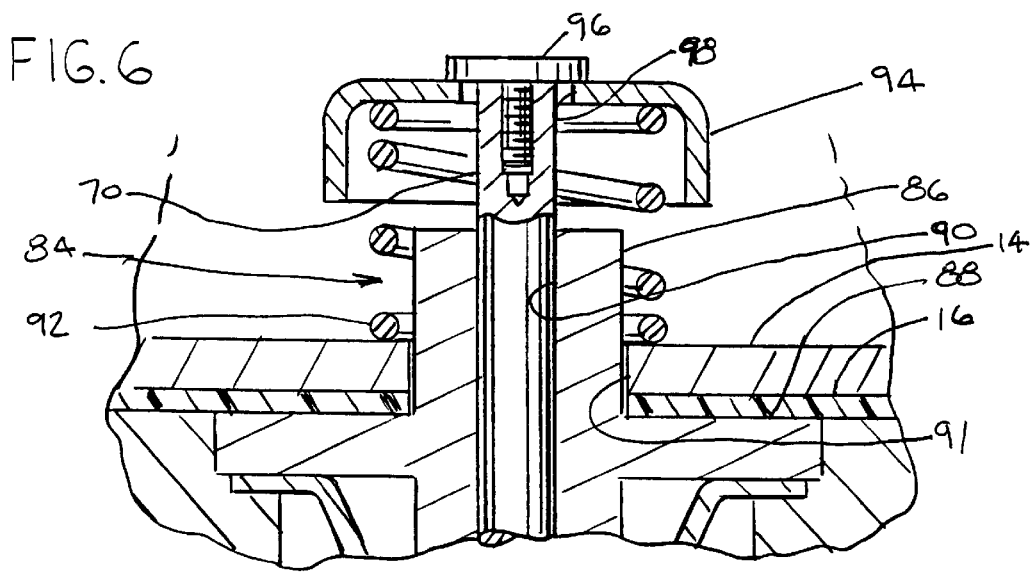
FIG. 6

EEGR VALVE WITH FLEXIBLE BEARING

FIELD OF THE INVENTION

The invention relates generally to EGR valves for automotive engines. More particularly, it relates to apparatus and methods for supporting solenoid armatures for electronic EGR valves.

BACKGROUND OF THE INVENTION

Almost all modern automotive engines have an electronic exhaust gas recirculation valve (EEGR valve) to recycle a portion of the exhaust gases of the engine into the intake air stream of the engine. The exhaust gases, especially those from spark-ignition gasoline engines, include a substantial amount of incomplete combustion products, including unburned fuel, oxides of nitrogen and other compounds. These gases contribute substantially to air pollution. EGR valves, and the more recent EEGR valves were installed on automotive engines to reduce this exhaust gas pollution by recycling a portion of the exhaust gases back into the intake air stream, thereby recombusting the exhaust gases and reducing pollution.

The EGR valves are subjected to severe environmental conditions that cause premature failure and require premature replacement. EGR valves are located in the engine compartments of automobiles and are typically mounted directly on the engine. As a result, they are subjected to extremes in temperature due to thermal conduction and convection from the engine, and due to the extremely hot exhaust gas stream that they are designed to throttle. Engine compartment temperatures commonly vary from −20C to 160C. In addition to thermal stresses, EGRs are subject to extreme vibration as they are directly mounted to automobile engines that vibrate. Finally, since the underside of most automobiles are not enclosed, the engine compartment air is often filled with dirt, dust, oil, chemical vapours, moisture and road salt. All of these factors cause the premature failure of EGRs and necessitate their premature replacement.

Electronic EGR valves are particularly subject to premature failure due to their design. Modern EEGR valves are unlike earlier EGR valves in that they use an electrical actuator, typically a linear solenoid to open the valve itself instead of the older and more robust diaphragm arrangement of earlier EGRs. As a result EEGRs have more parts to fail, they require tighter tolerances to operate properly, and they have more sliding surfaces that can rapidly wear due to fouling by contaminants such as oil, dirt, dust and the like. In addition, the thermal extremes cause uneven expansion and contraction which can cause components to bind rather than slide with respect to each other. Linear solenoids are particularly subject to damage due to the relatively large diameter of the solenoid armatures (the moving part of the solenoid) and the relatively large excursion of the armature required to fully open the valve itself. As a result, they have large surface areas in sliding contact and correspondingly large bearings.

It is the purpose of this invention to provide a novel means of supporting the armature of an EEGR valve that reduces the premature EEGR wear and failure by reducing the amount of sliding contact between the armature and the stator.

SUMMARY OF THE PRESENT INVENTION

In accordance with the first embodiment of the invention an EEGR valve for an internal combustion is provided including a solenoid having a toroidal electrical coil, a cylindrical armature disposed inside the toroidal coil and two bearings coupled to the armature and to a substantially stationary portion of the solenoid, wherein the bearings each include a disk having a plurality of rings of slits, each of the rings being radially spaced apart, and a valve assembly including a valve pintle coaxial with the armature and disposed to abut and be moved by the solenoid, the pintle including a head with a conical sealing surface, and a circular valve seat surrounding the head and disposed for sealing engagement with the conical surface to throttle the flow of exhaust gas. Each of the plurality of rings of slits may be angularly offset with respect to each other about the longitudinal axis of the armature. The plurality of rings may include at least four rings of slits. The valve may also include a spring disposed to hold the bearings in a deflected position when the valve assembly is in a closed position. Each of the plurality of rings of slits may include at least four slits. Each of the four slits in each of the plurality of rings may have the same length as the others of the four slits in the same ring. The four slits in each of the plurality of rings may describe an arc that has a center point near the center of the disk. The center points of the arc defined by each of the four slits in each of the plurality of rings may be substantially the same.

In accordance with the second embodiment of the invention, a solenoid is provided including a toroidal electrical coil, a cylindrical armature disposed inside the toroidal coil, and a first planar bearing coupled to and supporting the armature and also coupled to a substantially stationary portion of the solenoid, wherein the bearing includes a disk having a plurality of rings of penetrations, each of the rings being radially spaced with respect to the other rings. A second planar bearing may be coupled to the armature to support it. This bearing may be coupled to a substantially stationary portion of the solenoid. It may have a plurality of rings of penetrations each being radially spaced with respect to the others. The first and second bearings may be circular and may be fixed to first and second stationary portions of the solenoid, respectively. The first stationary portion may be an upper stator and the second stationary portion may be a lower stator. The upper stator may include a first plurality of posts to which the first bearing is fixed. The lower stator may include a second plurality of posts to which the second bearing is fixed. The armature may include a metal shaft having an upper end and a lower end and further the upper end of the shaft may be fixed to the first bearing and the lower end of the shaft may be fixed to the second bearing. The first and second plurality of posts may be spaced substantially equiangularly about the longitudinal axis and may be spaced a substantially constant distance from the longitudinal axis.

In accordance with a third embodiment of the invention, a method of driving a solenoid having a toroidal coil, an armature disposed inside the toroidal coil and first and second planar bearings coupled to and supporting the armature within the toroidal coil, and first and second fixed bearing mounts, the method including the steps of coupling a first end of the armature to the first planar bearing, fixing the periphery of the first planar bearing to the first fixed bearing mounts, coupling a second end of the armature to the second planar bearings, fixing the periphery of the second planar bearing to the second fixed bearing mounts, moving the armature to a first preloaded position in which the first and second bearings are deflected from a rest position to a preloaded position and the first and second bearings are concave in a first direction, holding the armature in the first preloaded position with a spring, deflecting the armature and the first and second bearings to a second deflected position in which the first and second bearings are concave in a second direction that is opposite the first direction, by applying an electrical signal to the solenoid. The method may further include the step of forming a first and second plurality of slots in the first and second bearings by fine blanking the first and second bearings, respectively. The method may also include the step of providing a stress relief at each end of the first and second plurality of slots by fine blanking. The method may also include the step of disposing the first plurality of slots in a radially extending series of concentric circular rings about a center of the first bearing, and the step of disposing the second plurality of slots in a radially extending series of concentric circular rings about a center of the second bearing.

Other principal features and advantages of the invention will become apparent to those skilled in the art upon review of the following drawings, the detailed description and the appended claims.

BRIEF DESCRIPTION OF THE DRAWINGS

FIGS. 4 and 5 are fragmentary detailed cross-sectional views of the upper and lower flexible bearings of FIG. 1, respectively;

FIG. 6 is a fragmentary detailed cross-sectional view of the upper end of the valve pintle of FIG. 1.

Figure 1:
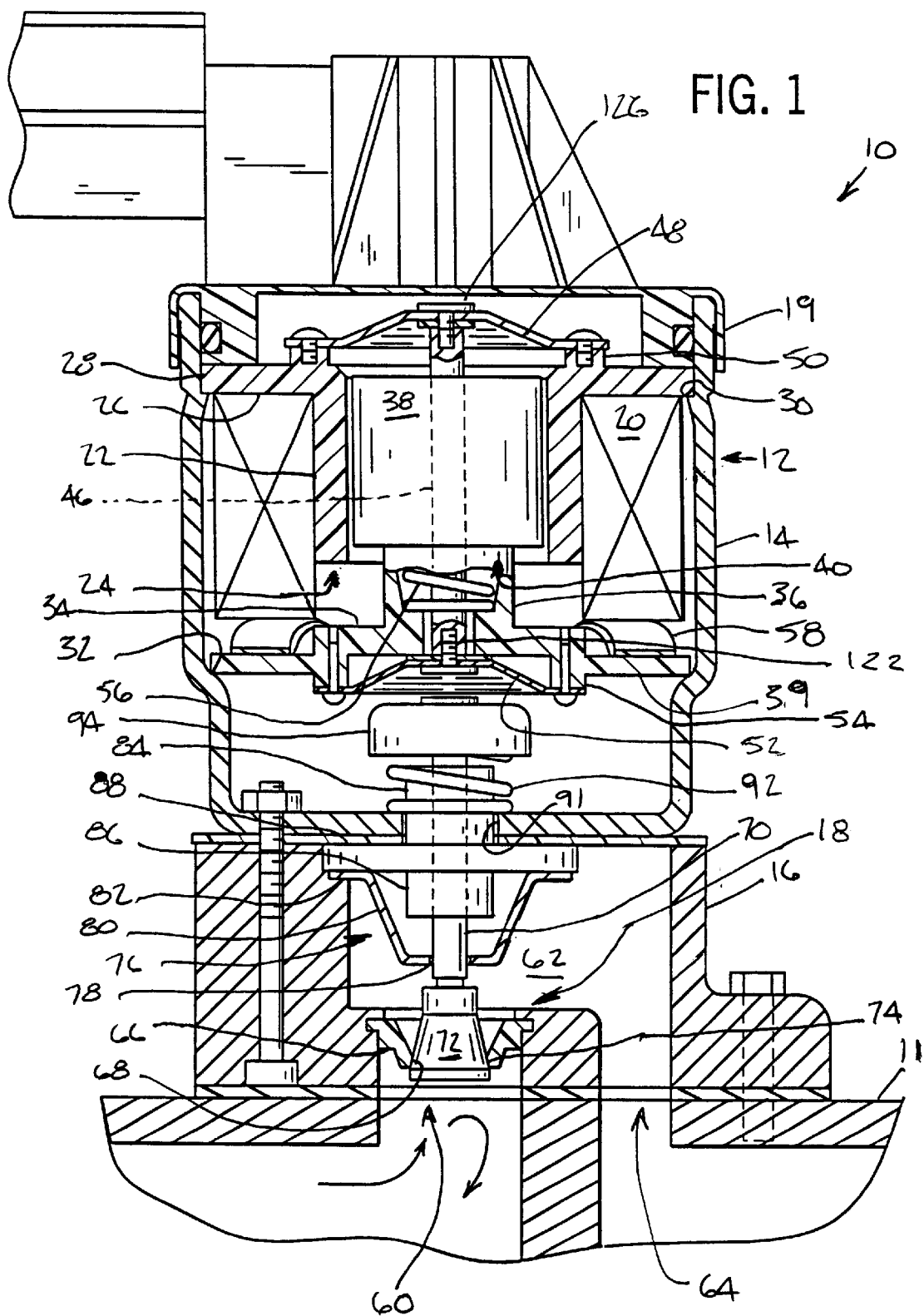
FIG. 1 is a partial cross-sectional view of an EEGR valve with a flexible bearing in a closed position with upper and lower flexible bearings in an upwardly deflected position.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
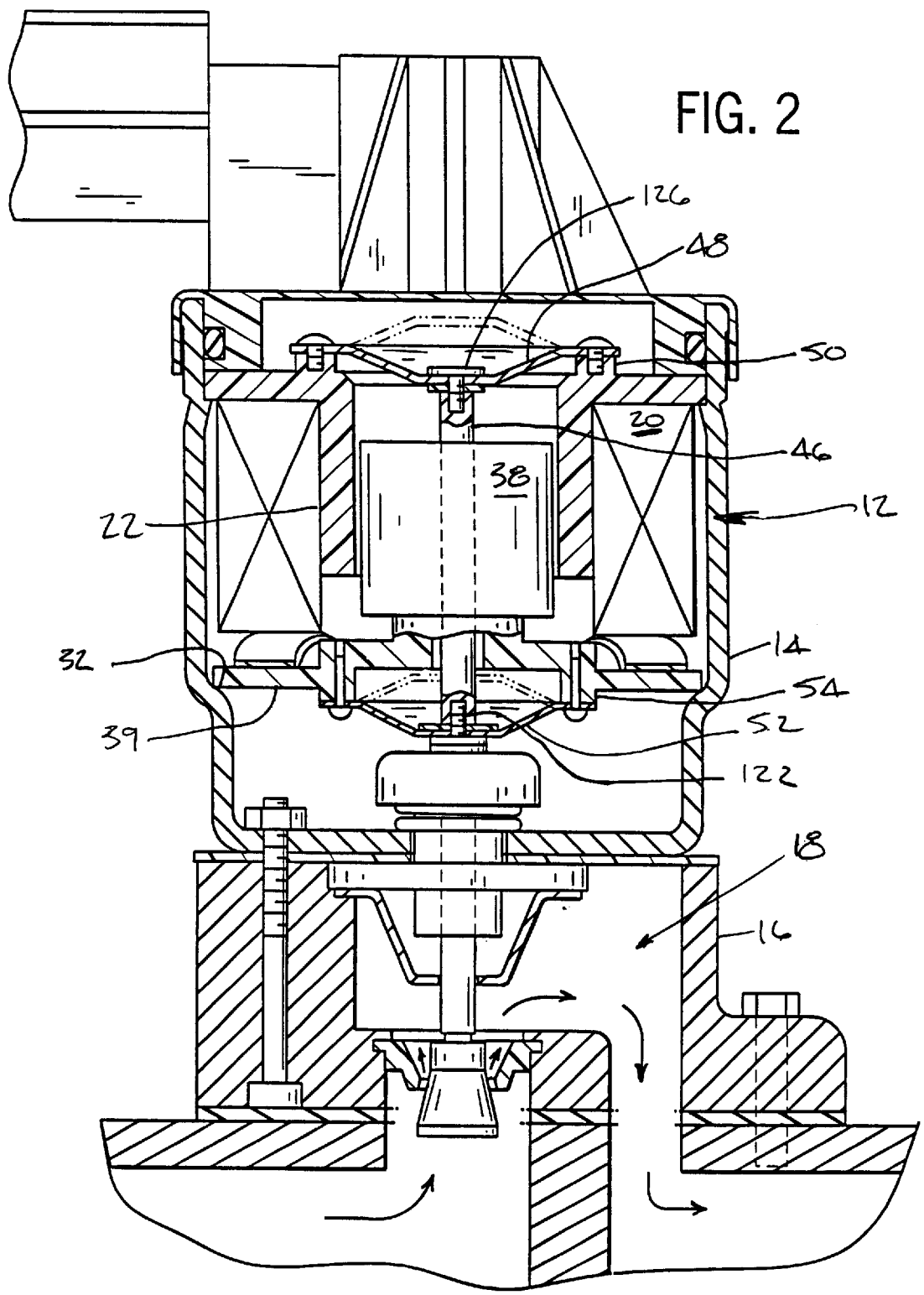
FIG. 2 is partial cross-sectional view of the EEGR valve of FIG. 1 in an open position with upper and lower bearings in a downwardly deflected position.

FIGS. 1 and 2 show an electronic exhaust gas recirculation (EEGR) valve 10 coupled to an intake manifold 11 of an internal combustion, spark-ignition engine of an automobile. A solenoid 12 is disposed in a metal shell 14 that is fixed to a lower metal shell 16 that contains and supports a valve assembly 18. A cap 19 covers the otherwise open upper end of shell 14.

Solenoid 12 includes an electrical coil 20 in the form of a torus having a rectangular toroidal cross section. It also includes an upper stator 22 in the form of a right circular cylinder 24 extending downward into the coil. Upper stator 22 also includes a substantially planar rim 26 that extends outwardly from an upper end of cylinder 24. An outer edge 28 of the rim abuts shell 14 and rests upon a shelf or ledge 30 extending inward from an inner surface of shell 14. A similar shelf or ledge 32 is disposed adjacent the bottom of shell 14 and supports lower stator 34. Lower stator 34 is formed similar to upper stator 22, and includes a right circular cylinder 36 that extends upward into the coil and a substantially planar rim 39 that is coupled to and extends outwardly from the lower end of cylinder 36.

Figure 3:
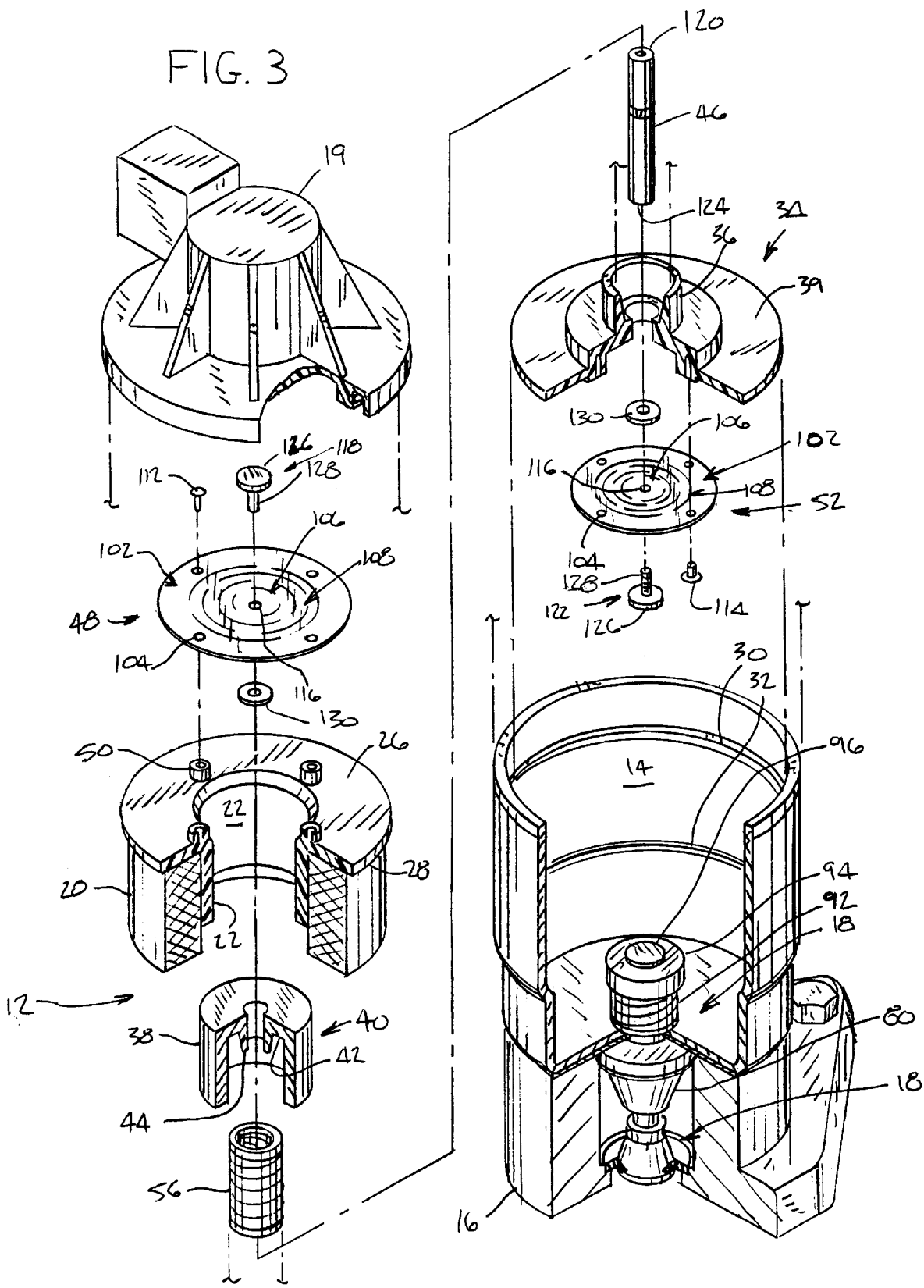
FIG. 3 is an exploded view of the EEGR valve of FIGS. 1 and 2.

An armature 38 of solenoid 12 has a right circular cylinder 40 with an outer surface that is spaced closely enough to the inner surface of cylinder 24 to permit the formation of a superior magnetic flux for driving armature 38. Armature 38 also includes a flange 42 (FIGS. 3 and 4) that is coupled to and extends inwardly from cylinder 40 to join cylinder 40 with a shaft support 44. The internal surface of shaft support 44 is coaxial with the outer surface of cylinder 40. It is fixed to shaft 46 by an interference fit and transmits the force applied to armature 38 to valve assembly 18. The shaft is also coaxial with the outer surface of cylinder 40.

Referring now to FIGS. 4 and 5, bearings 48 and 52 of solenoid 12, support armature 38 within coil 20. They hold armature 38 a predetermined distance from upper stator 22 over a range of axial positions. Bearing 48 is attached to posts 50 that are coupled to and extend upward from upper stator 22. Bearing 52 is attached to posts 54 that are coupled to and extend downward from lower stator 34.

A compressor spring 56 of solenoid 12 is disposed between lower stator 34 and armature 38 to bias armature 38 in an upward direction. The spring also biases bearings 48 and 52 upwardly into a concave-down preloaded shape.

Spring 58 of solenoid 12 is disposed between lower stator 34 and coil 20. It is a wave spring and applies sufficient force to the bottom of coil 20 to hold the coil against upper stator 22.

Lower metal shell 16, to which valve assembly 18 is attached, has an exhaust gas inlet 60 that communicates exhaust gas to an internal chamber 62 in which valve assembly 18 is mounted. Shell 16 has an outlet 64, also in communication with internal chamber 62 from which exhaust gas exits. Collectively, inlet 60, chamber 62 and outlet 64 define the exhaust gas path through EEGR valve 10.

Referring back to FIG. 1, valve assembly 18 includes a valve seat 66 that is fixed in inlet 60 and has a seating surface 68. Valve pintle 70 of assembly 18 has a plug 72 with a mating frusto-conical sealing surface 74 that abuts and seals against seat 68 to block exhaust gas flow through EEGR valve 10. Referring to FIG. 2, due to its conical shape, sealing surface 74 can be moved downward, away from solenoid 12. As it moves downward, it creates an annular gap between seating surface 68 and sealing surface 74 through which exhaust gas can pass. Due to the frusto-conical shape of surface 74, this gap increases in size as pintle 70 moves downward. Hence, surface 74 and seating surface 68 provide an exhaust gas flow rate that is substantially proportional to the distance that pintle 70 moves downward away from seat 66 (i.e., the flow rate through the valve is substantially proportional to downward linear displacement of pintle 70).

A heat shield 76 is provided to reduce the temperature of pintle 70 during operation. It has a substantially circular hole 78 at its bottom, through which pintle 70 extends, a frusto-conical side wall 80 that opens in an upward direction, and a substantially planar flange 82 that extends outward from the top of conical wall 80 and is wedged into the top of shell 16 to hold the heat shield in position. While hole 78 surrounds pintle 70, it is spaced slightly away from the pintle to avoid interference and to permit pintle 70 to move freely up and down. Heat shield prevents the majority of exhaust gas from circulating freely around pintle 70, thereby reducing heat transfer from the gas to pintle 70 in operation.

Referring now to FIG. 6, pintle bearing 84 surrounds and supports the shaft of pintle 70. Pintle bearing 84 is configured as a right circular cylinder 86 with a flange 88 extending outward therefrom. Cylinder 86 has a longitudinal axial passageway 90 through which pintle 70 extends. Pintle 70 is supported by the interior surface of the passageway, which is sized to minimize exhaust gas flow upward through the passageway toward the solenoid, yet to provide support to the pintle shaft sufficient to hold it in alignment with seat 68. Flange 88 is fixed to shell 16 to support bearing 84. The upper end of bearing 84 extends through opening 91 upward into the bottom portion of shell 14, and is surrounded by spring 92. Spring 92 closes the valve 10. It is a compression spring with a lower end that abuts the bottom of shell 14 and an upper end that abuts the underside of spring retainer 94. Spring retainer 94 is formed as an upturned cup, having a center hole 98 through which the shaft of pintle 70 passes. A fastener 96, here shown as a screw threaded into the upper end of pintle 70, retains the spring retainer 94 and transfers the spring force from spring retainer 94 to pintle 70. Fastener 96 has a head that extends outward from the upper end of pintle 70, and engages the upper surface of spring retainer 94 surrounding center hole 98. Thus, spring 92 presses upward against spring retainer 94. Spring retainer 94, in turn, pulls upward on fastener 96. Fastener 96, in turn pulls upward on pintle 70 to close valve 10.

In alternative embodiments (not shown) an armature shaft may be connected to a pintle or made integral with a pintle.

Details of the Bearings

Without intending to be limited in any manner by theories of operation, it is believed that bearings 48 and 52 are subjected to unique stresses and strains due to their excitation by a pulse-width modulated (PWM) electrical signal. This signal causes significant high frequency oscillation of armature 38 within stators 22 and 34, and as a result induces a high frequency oscillating stress to bearings 48 and 52. While the average electrical signal applied to the coil, and thus flux induced in armature 38 and force applied to the bearings, may be constant, the rapid on/off operation of the PWM signal adds a high frequency component to the bearing stress and therefore may lead to premature bearing failure unless significant care is taken in the bearing design. Indeed, it is this high frequency oscillation that is one of the causes of significant wear of prior art solenoids driven by PWM signals. The high frequency, low amplitude oscillation of the armature within prior art (and typically plastic) cylindrical sleeve bearings disposed between the outer surface of the armature and the inner surface of the stators results in accelerated bearing wear as the surfaces vibrate and rub against each other. This is one of the reasons that the design of a new bearing was undertaken for use in an EEGR valve.

Figure 7:
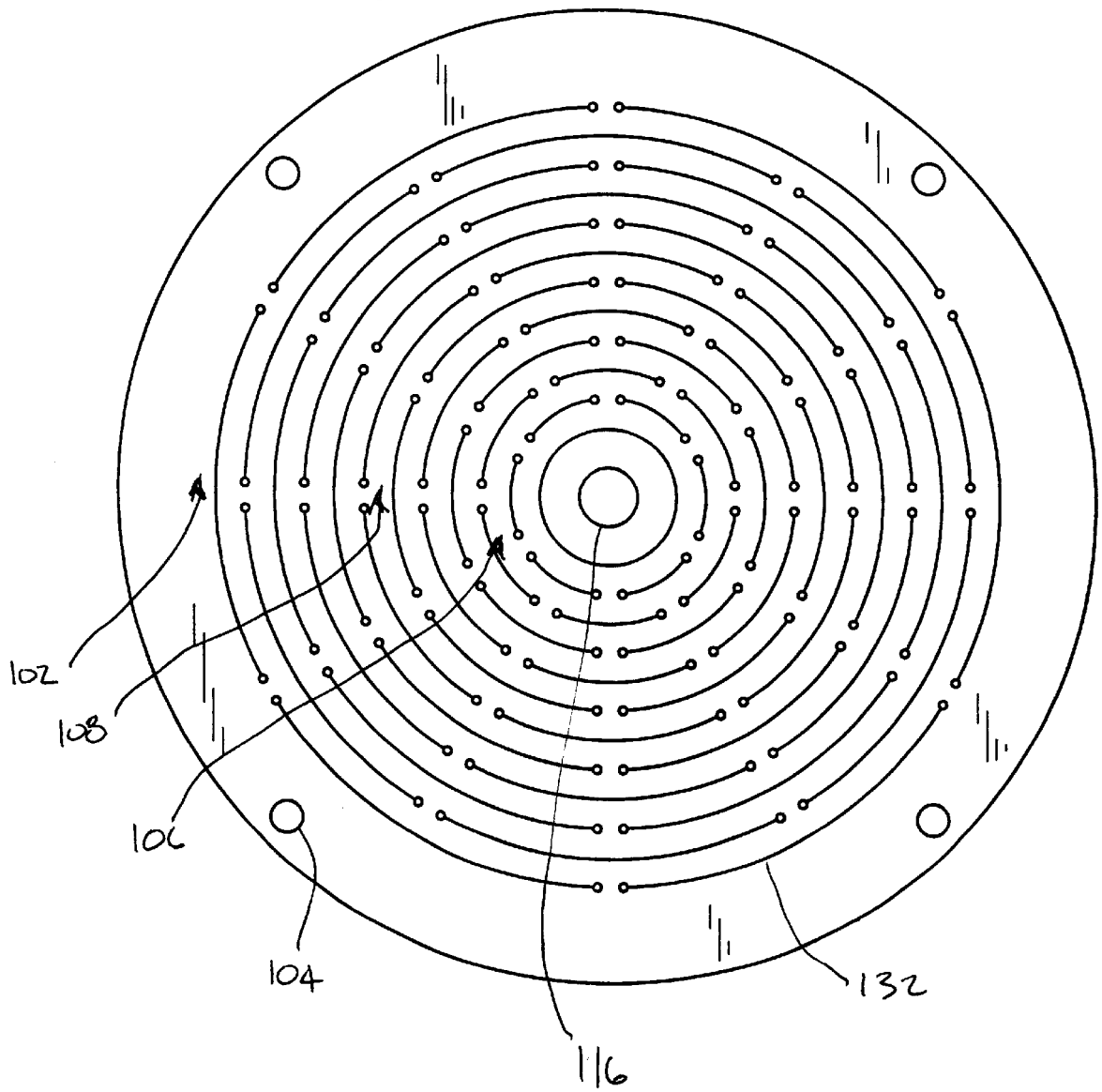
FIG. 7 is a plan view of the upper and lower flexible bearings of FIGS. 1–5.

FIG. 7 is an illustration of bearings 48 and 52. Bearings 48 and 52 are in the form of a disk 100 that is 50 mm in diameter in the illustrated embodiment with a thickness of 0.15 mm and having an outer annular portion 102 with four equally-spaced holes 104 for attaching bearings 48 and 52 to the upper and lower stators 22, and a central portion 106 for attaching bearings 48 and 52 to the armature, and an intermediate annular portion 108, having a plurality of arcuate slots to permit the central portion 106 to flex up and down (as shown in FIGS. 1 and 2, respectively) with respect to outer annular portion 102.

The outer annular portion 102 of each bearing 48, 52 is configured to be attached to a fixed portion of solenoid 12 so that it is substantially stationary with respect to metal shell 14. In the preferred embodiment, shown in FIGS. 1–6, outer annular portion 102 of bearings 48 and 52 are attached to the upper and lower stators 22 and 34, respectively. Bearings 48, 52 are attached at a plurality of locations spaced apart around the periphery of outer annular portion 102. Preferably it is attached at least at three points. More preferably, and as shown in FIGS. 1–7, it is attached at least at four points. These attachment points are preferably spaced substantially equidistantly about the circumferential edge of the bearings. Thus, in the embodiment shown in the figures, the four attachment points are disposed at 90 degree angles with respect to the their adjacent attachment points (4 times 90=360 degrees, or one circumference). If there are three attachment points, they would preferably be spaced approximately 120 degrees apart (3 times 120=360 degrees, or one circumference). Similarly, if five attachment points were used, they would be spaced approximately 360 (one circumference) divided by 5 (the number of fasteners) or 72 degrees apart. The attachment points for bearings 48, 52 are holes 104 that pierce outer annular portion 102 of bearings 48, 52. Fasteners (threaded fasteners 112 for upper bearing 48, rivets 114 for lower bearing 52) pass through holes 104 and are attached to posts 50, 54 of upper and lower stators 22 and 34, respectively. Posts 50, 54 and holes 104 are disposed at substantially the same radial distance from the longitudinal axis of armature 38.

Central portion 106 has a hole 116 to which armature 38 is attached. Holes 116 are located substantially at the centers of bearings 48, 52 illustrated in FIG. 7 and are concentric with the longitudinal axis of armature 38. Upper bearing 48 is attached to armature shaft 46 by a fastener shown in FIGS. 1–5 as a screw 118 threaded into an upper end 120 of armature shaft 46 through hole 116. Lower bearing 52 is similarly attached to armature shaft 46 by a fastener shown in FIGS. 1–5 as a screw 122 threaded into a lower end 124 of armature shaft 46 through hole 116. Each of these screws 118, 122 have a head 126 that holds bearings 48, 52 to the respective ends of armature shaft 38 and a threaded shank 128 that passes through holes 110 and screws into the respective ends of armature shaft 38. A washer 130 is disposed between each of bearings 48, 52 and armature shaft 38 to provide some cushioning to bearings 38, 52 and reduce the potential for bearings 48, 52. If necessary, a similar washer may be disposed between the head of the fasteners and the bearings 48, 52 to provide additional cushioning for bearings 48, 52. It is important to align the bearings 48, 52, stators 22, 34 and armature 38 with respect to each other. The preferred method is to make the stator 22, 34 and armature 38 attachment points to tight tolerances and provide minimal gaps between attachment holes 104 and the outer diameters of fasteners 112, 114. This reduces the ability of armature 38 to move laterally (i.e. perpendicular to its longitudinal axis) with respect to stators 22, 34.

Intermediate annular portion 108 has a plurality of arcuate slits or slots 132 that are circumferentially disposed around the center of bearings 48, 52. These slits are arranged in substantially concentric rings of increasing radii. The distances between each such ring and the two rings immediately adjacent are about equal. Similarly, the distances between each pair of adjacent rings of slits is about equal to the width of the intermediate portion.

Each slit has a stress relief at each of its ends. This stress relief is in the form of an opening with a radius of curvature substantially larger than the average width of the slit. For each of the slits, the radius of the stress relief is substantially larger than the average distance between the adjacent sides of that slit. In the embodiment of FIG. 7, for example, the slits are preferably formed by fine blanking which spaces opposing sides of each slit about 0.04 mm apart. In contrast to this, the radius of curvature of the strain relief is 0.2 mm. The ratio of the radius of curvature of the strain reliefs to the average spacing of the opposing sides of the slit is therefore 5 to 1.

In the preferred embodiment, each ring comprises six slits. There are two primary constraints on the number of slits per ring. First, as the number of slits is increased, their length inherently decreases. As the length of each slit decreases, the upward or downward axial deflection of one side of the slits with respect to the other side of the slits is reduced. As a result, the total deflection permitted by that ring of slits is reduced. This would seem to suggest that the number of slits per circumferential ring should be reduced to its absolute minimum: two. This, however, is unacceptable for many applications where precise alignment is required between armature and stators, since the greatly increased length of the slits as a percentage of total circumferential distance permits the strips of bearing 48, 52 between the slits to twist, and therefore permits the centers of bearings 48, 52 to become offset not just axially, as desired, but laterally, which could permit the armature to rub against the stators. The preferred number of slits per each circumferential ring of slits is therefore between ten and two, more preferably between eight and three, and most preferably between seven and four.

Each circumferential ring of slits is circumferentially offset with respect to the adjacent rings by an angular distance (measured from the center of the rings) of one-half the total length of a single slit. Total length, in this context, refers to the angular displacement of any point on a slit to the same point on an adjacent slit, where the slits are of equal length and equidistantly spaced. In the preferred embodiment as shown in FIG. 7, since each ring has six slits, the two rings of slits adjacent to this ring are offset by half of a single slit spacing.

In other words, since each ring of the preferred embodiment comprises six slits, the midpoint of each slit is spaced 360 (one circumference) divided by six (the number of slits in the ring) divided by two (one-half the space required for a slit) or 30 degrees away from its adjacent rings. The midpoints of the slits in the two immediately adjacent rings of slits are therefore moved one-half the total length of a single slit with respect to each other. This ratio provides a different angular offset depending upon the number of slits in each ring. For example, for a series of rings comprised of four slits, the preferred angular spacing would be 360 (one circumference) divided by 4 (the number of slits in each ring) divided by 2 (the desired one-half offset) or ring to ring circumferential offset of 45 degrees.

Bearings 48, 52, when at rest with no current passing through solenoid coil 20, is in an upwardly extended position, as shown in FIGS. 1, 4 and 5. This position is maintained by applying a spring force to the armature, forcing it upward. This causes the slits to deform in the following manner. In the embodiment of FIGS. 1–6, this spring force is applied by spring 56, which is disposed between a fixed solenoid surface (in the preferred embodiment, lower stator 34) and armature 38. This is best shown in FIGS. 1, 4 and 5. Spring 56 deflects bearings 48, 52 upward until they both assume an inverted bowl shape with their concave sides facing down, i.e., facing valve assembly 18. As current is provided to coil 20, armature 38 is forced downward toward valve 48, compressing spring 56 until bearings 48, 52 are flat and therefore unstressed. As additional current is applied to coil 20, armature 38 moves further downward until bearings 48, 52 are deflected downward and they both assume a bowl shape with their concave sides facing upward. In the embodiments of FIGS. 1–6, bearings 48, 52 are attached to solenoid 12 such that they are both deflected equally upward or downward at each armature 38 position over the working range of valve 10. Thus, when armature 38 is moved to a position where upper bearing 48 is flat, lower bearing 52 is flat as well. When armature 38 is moved upward such that upper bearing 48 is deflected 0.1 inch (for example) upward above the flat position, lower bearing 52 is also deflected upward 0.1 inch. When armature 38 is moved downward such that upper bearing 48 is deflected 0.1 inch below the flat position, lower bearing 52 is also deflected downward 0.1 inch. This arrangement provides for the accurate and rapid alignment of solenoid 12 during assembly. In addition, by deflecting bearings 48, 52 equally, any lateral deflection by deflecting one bearing axially upward is matched by a similar deflection in the other bearing and the axis of armature 38 remains parallel to the longitudinal axis of valve 10.

The intermediate section has ten adjacent rings of slits. By having a relatively large number of rings, each slit in the ring is required to deflect less to achieve the same overall bearing deflection than a bearing with fewer rings. In practice, however, the more rings that are provided, for a bearing 48, 52 with a given overall diameter and number of slits per ring, the greater the tendency for lateral deflection of armature 38 and rubbing between armature 38 and stators 22, 34. In practice four rings of slits or more are preferred; more preferably, six or more rings, and most preferably, eight or more rings.

Thus, it should be apparent that there has been provided in accordance with the present invention an EEGR valve with flexible bearing that fully satisfies the objectives and advantages set forth above. Although the invention has been described in conjunction with specific embodiments thereof, it is evident that many alternatives, modifications and variations will be apparent to those skilled in the art. For example, bearings 48 and 52 need not have the same outer diameter, nor need they be mounted in the identical way. Each bearing can be separately configured and configured differently from the other bearing. In addition, for use of manufacture, the slits or slots in the preferred embodiment are made by fine blanking a single slit whose sides are closely adjacent to each other. In other embodiments, the side walls of the slits or slots can be spaced apart, hence providing a hole or opening instead of two closely adjacent walls. While the slits or slots are preferably arcuate, they can be straight or can define a polygonal opening such as a triangular or trapezoidal shaped hole. Accordingly, it is intended to embrace all such alternatives, modifications and variations that fall within the spirit and broad scope of the appended claims.

The embodiments of the invention in which an exclusive property or privilege is claimed are defined as follows:

1. An EEGR valve for an internal combustion engine, comprising:
   a solenoid further including,
   a toroidal electrical coil,
   a cylindrical armature disposed inside the toroidal coil, and
   two bearings coupled to the armature and to a substantially stationary portion of the solenoid, wherein the bearings each include a disk having a plurality of rings of slits, each of the rings being radially spaced apart; and a valve assembly including a valve pintle coaxial with the armature and disposed to abut and be moved by the solenoid, the pintle including a head with a conical sealing surface, and a circular valve seat surrounding the head and disposed for sealing engagement with the conical surface to throttle a flow of exhaust gas.

2. The valve of claim 1, wherein each of the plurality of rings of slits are angularly offset with respect to each other about the longitudinal axis of the armature.

3. The valve of claim 2 wherein the plurality of rings of slits includes at least four rings of slits.

4. The valve of claim 3, further including a spring disposed to hold the bearings in a deflected position when the valve assembly is in a closed position.

5. The valve of claim 4, wherein each of the plurality of rings of slits includes at least four slits.

6. The valve of claim 5, wherein each of the four slits in each of the plurality of rings has the same length as the others of the four slits in the same ring.

7. The valve of claim 6, wherein each of the four slits in each of the plurality of rings describes an arc that has a center point near the center of the disk.

8. The valve of claim 7, wherein the center points of the arc defined by each of the four slits in each of the plurality of rings is substantially the same.

9. A solenoid, comprising:
a toroidal electrical coil,
a cylindrical armature disposed inside the toroidal coil,
a first planar, circular bearing coupled to and supporting the armature and also coupled to a first substantially stationary portion of the solenoid, wherein the first bearing includes a disk having a first plurality of rings of penetrations, each of the rings being radially spaced with respect to the other rings of the first plurality of rings; and, a second planar bearing coupled to and supporting the armature and also coupled to a second substantially stationary portion of the solenoid, wherein the second bearing includes a disk having a second plurality of rings of penetrations, each of the second plurality of rings being radially spaced with respect to the other rings of the second plurality of rings.

10. The solenoid of claim 9, wherein the second bearing is circular and is fixed to the second stationary portion of the solenoid.

11. The solenoid of claim 10, wherein the penetrations are slits.

12. The solenoid of claim 10, wherein the first stationary portion is an upper stator and the second stationary portion is a lower stator.

13. The solenoid of claim 12, wherein the upper stator includes a first plurality of posts to which the first bearing is fixed.

14. The solenoid of claim 13, wherein the lower stator includes a second plurality of posts to which the second bearing is fixed.

15. The solenoid of claim 14, wherein the armature includes a metal shaft having an upper end and a lower end and further wherein the upper end of the shaft is fixed to the first bearing and the lower end of the shaft is fixed to the second bearing.

16. The solenoid of claim 15, wherein the first and second plurality of posts are spaced substantially equiangularly about the longitudinal axis and are spaced a substantially constant distance from the longitudinal axis.

* * * * *